United States Patent [19]

Lafont et al.

[11] 4,245,893
[45] Jan. 20, 1981

[54] EXTERNAL REAR VIEW MIRROR CONTROLLABLE FROM INSIDE A VEHICLE

[75] Inventors: Raymond Lafont, Paris; Patrick J. J. Desforges, Evry, both of France

[73] Assignee: Britax (GECO) S.A., Vulaines sur Seine, France

[21] Appl. No.: 1,477

[22] Filed: Jan. 8, 1979

[30] Foreign Application Priority Data

Jan. 25, 1978 [FR] France .............................. 78 02083

[51] Int. Cl.³ .............................................. G02B 5/08
[52] U.S. Cl. ................................................. 350/289
[58] Field of Search ......................... 350/289; 248/487

[56] References Cited

U.S. PATENT DOCUMENTS

| 4,114,988 | 9/1978 | Enomoto | 350/289 |
| 4,153,342 | 5/1979 | Mittelhauser | 350/289 |

Primary Examiner—F. L. Evans

[57] ABSTRACT

The invention relates to an external rear view mirror with control from the inside of a vehicle. The external rear view mirror has a mirror-box assembly orientable from the inside of a vehicle, by electrical control, in two directions at right angles, forwards-backwards and up-down. It includes, housed inside said box, two parallel drive shafts each controlling one of the two orientations and drive means capable of driving the two abovesaid shafts. The means for controlling the orientation of the mirror-box assembly are interposed between the two shafts and the end of an arm for fixing the rear view mirror of which the other end is made firmly fast to the outer wall of the vehicle.

11 Claims, 6 Drawing Figures

EXTERNAL REAR VIEW MIRROR CONTROLLABLE FROM INSIDE A VEHICLE

FIELD OF THE INVENTION

The present invention relates to an external rear view mirror, notably for a vehicle, controlled in horizontal and vertical orientation from the inside of the vehicle.

DESCRIPTION OF THE PRIOR ART

Known devices use, for the adjustment of the rear view, the rotation of the mirror alone with respect to the mirror-holder cup of the rear view mirror. The drawbacks of these systems are numerous, faulty sealing, locking in the case of ice or snow, deterioration due to moisture and to dust, and bulkiness. Other known devices rotate the assembly formed by the rear view mirror and its arm at the level of the junction with the bodywork which necessitates the provision on the latter of an entire mechanism which is often difficult to position by the constructor or the user and makes difficult and laborious the interchangability of an ordinary rear view mirror and an electrically controlled rear view mirror.

It is an object of the present invention to provide an external rear view mirror controlled in orientation electrically from the inside of a vehicle, which is simple and robust in design and does not have the drawbacks of presently known systems mentioned above.

GENERAL DESCRIPTION OF THE INVENTION

Accordingly, there is provided according to the invention an external rear view mirror of which the mirror-box assembly is orientable from the inside of a vehicle by electrical control, in two directions at right angles, forwards-backwards and up-down, characterized in that it includes, housed inside said box, two parallel drive shafts each controlling one of the two orientations and a drive means capable of driving the two above-mentioned shafts, and in that the means for controlling the orientation of the mirror-box assembly are interposed between the two shafts and the end of a fixing arm for the rear view mirror of which the other end is fastened firmly to the outer wall of the vehicle.

According to one embodiment, the end of one of the shafts carries a pinion engaging with a toothed sector movable in rotation relatively to the box with respect to an axis coaxial with the second shaft, said toothed sector being fixed to a yoke mounted to oscillate on the end of said arm around a substantially vertical axis, said second shaft being capable of moving said yoke angularly with respect to the arm by appropriate means.

The drive means may be constituted by two independent motor-reducing gear units each driving one of the two shafts, the two units being both fixed to the inside of the box.

According to a modification, the drive means can be constituted by a single motor-reducing gear with two speeds and of which the output shaft is connected to the two orientation control shafts by a selective means ensuring mechanical connection with one of the two shafts for one of the two above-mentioned speeds and with the other shaft for the other speed.

BRIEF DESCRIPTION OF THE DRAWINGS

Other features and advantages will emerge from the description which follows of preferred embodiments of the rear view mirror according to the invention, which description is given purely by way of example and with reference to the accompanying drawings in which.

DESCRIPTION OF PREFERRED EMBODIMENTS

Figure 1:
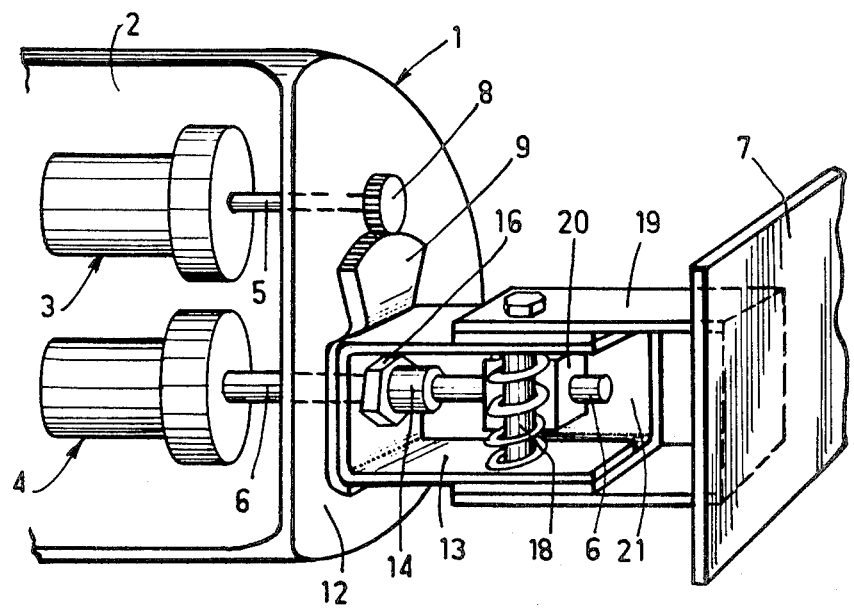
FIG. 1 shows a partial perspective view of a first embodiment of a rear view mirror according to the invention.
Figures 2, 6:
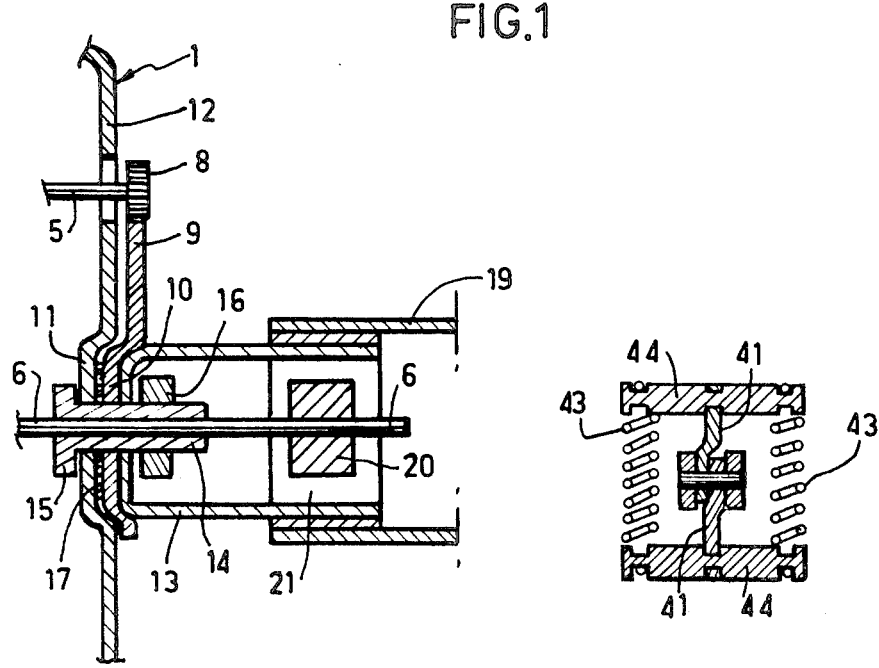
FIG. 2 shows a partial view in section along the plane of the two control shafts of the rear view mirror of FIG. 1.
FIG. 6 shows a sectional view along the line VI—VI of the embodiment of FIG. 5.

The rear view mirror shown in FIGS. 1 and 2 includes a box or cup 1 carrying a mirror (not shown) of which the plane can be symbolized by the surface 2 of the cup 1.

Inside the cup 1 are mounted, fixed with respect to the cup, two motor-reducing gear assemblies 3 and 4 of which the two output shafts, respectively, 5 and 6, are parallel and emerge from the cup 1 in the direction of the wall (symbolized at 7) of the vehicle on which the rear view mirror is fixed. This wall 7 is, for example, a portion of the body work of the vehicle (notably a door).

One of the drive shafts 5 carries at its outer end a pinion 8 engaging a toothed sector 9 pivotably mounted around the axis of the other drive shaft 6. To this end, the toothed sector 9 is provided, at its other end, with a circular cup 10 engaged in a complementary circular cup 11 formed in the lateral surface 12 of the cup 1 coaxially with the shaft 6.

The cup 10 can pivot freely in the cup 11 with respect to the latter.

On the surface of the cup 10 turned towards the wall 7 is mounted a yoke 13.

The surfaces in contact of the part 9 and the yoke 13 are conformed so relative pivoting is not possible between the two parts around the axis of the shaft 6 which passes through the cups 10, 11 and the yoke 13 by pivoting in a sleeve 14.

The sleeve 14 bears a shoulder 15 inside the cup 1.

A nut 16 engaged on a threading of the sleeve 14 is for ensuring the fastening of the cup 1 and of the sector 9 to the yoke 13, a washer 17 being designed to permit relative rotation between the cups 11 and 10 around the axis of the shaft 6.

The yoke 13 is pivotally mounted on a substantially vertical axle 18. The yoke 13 is articulated on a second yoke 19 firmly mounted on the wall 7.

The shaft 6 is threaded and engages a nut 20 fast to a third yoke 21 gripped between the two yokes 13 and 19.

The assembly of parts 8, 9, 13 and 19 is enclosed in a sort of bellows type sleeve (not shown) connecting the wall 7 to the box 1 of the rear view mirror.

The operation of the device described above is as follows.

The motor-reducing gear 3 is responsible for the up-down orientation of the mirror-box assembly 1. To this end, the rotation of the pinion 8 on the toothed sector 9 which is blocked with respect to the yoke 13 causes the movement of the pinion 8 which rolls along the toothing (inwardly curved along a circular arc centered on the shaft 6) of the sector 9. This rotates the assembly of the box 1 around the axle of the shaft 6 in one direction or the other according to the direction of the energizing current of the electric motor.

The control of the motor-reducing gears 3 and 4 is effected from the dashboard, for example, of the vehicle, connected to motors by electric supply leads (not shown in the figures).

The motor-reducing gear 4 is responsible for the forwards-backwards orientation adjustment of the assembly of the box 1.

To this end, the rotation of the shaft 6 causes, through the known system formed by the nut 20 and the yoke 21, the rotation of the assembly constituted by the box 1 and the yoke 13 around the axle 18 of the yoke 19 which constitutes the support arm (fixed) of the rear view mirror.

The yoke 21 is immobile with respect to the yoke 19 and it is provided with a housing receiving a finger fast to the nut, these members not being shown since they are well known and do not constitute a feature of the invention. For more detail on such a device reference may be made to the patent application filed in France in the names of Raymond LAFONT and the Company styled BRISTOL STREET GROUP INTERNATIONAL LTD. under French Pat. No. 76 35 838 and entitled "External Rear View Mirror With a Cup Orientable From Inside a Vehicle". The nut 20 may hence follow the orientation of the shaft 6 whilst being retained in the fixed yoke 21. It is recalled that in the case of frontal shock, the rear view mirror can be folded back laterally by means of the fastening system of the yoke 21 on the yoke 19 which, beyond a certain force exerted frontally on the box 1, frees the yoke 21 which pivots around the axle 18 and permits the box 1-yoke 13-yoke 21 assembly to fold back against the wall 7 of the vehicle.

The rotation of the shaft 6 in one direction or the other orients the box towards the front or the rear of the vehicle.

Figure 3:
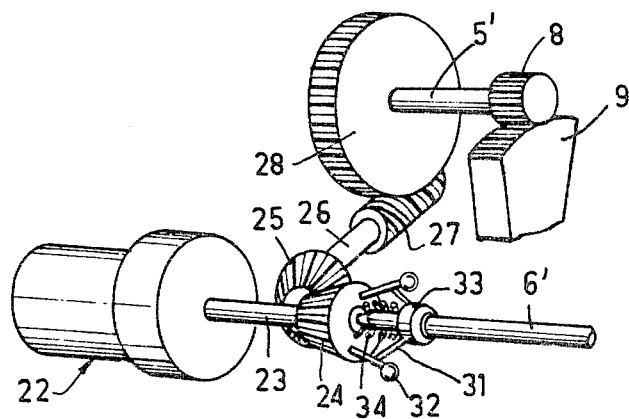
FIG. 3 is a partial perspective view of a second embodiment of the rear view mirror according to the invention.
Figure 4:
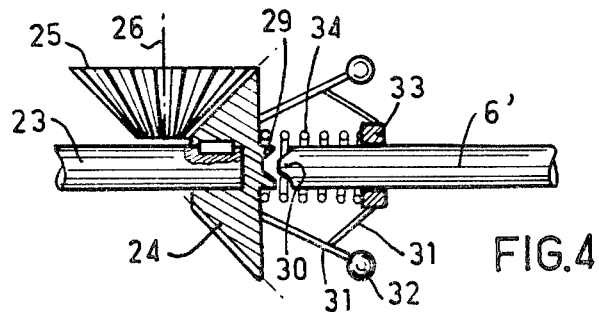
FIG. 4 shows a partial view in section of the device of FIG. 3 along the axis of one of the control shafts.

FIGS. 3 and 4 illustrate another embodiment of a rear view mirror according to the invention.

In this other embodiment, a single motor-reducing gear 22 is provided housed inside the box (not shown) of the rear view mirror.

This motor-reducing gear 22 can control at the same time the shaft 5' for adjusting the up-down orientation and the shaft 6' the adjustment of the forward-backward orientation, the two shafts 5' and 6' being parallel.

The shaft 5' drives the pinion 8 engaging the toothed sector 9 as in the embodiment of FIGS. 1 and 2.

The shaft 6' drives a system identical with that (nut 20, yoke 21) of FIGS. 1 and 2 or another equivalent system.

The output shaft 23 of the motor-reducing gear 22 drives a conical pinion 24 mounted at the shaft end and which can slide, axially, the pinion 24 being, for example, keyed to the shaft 23 (FIG. 4).

In the axial position of the pinion 24 closest to the motor-reducing gear 22, the pinion 24 is in engagement with a conical pinion 25 fast to a shaft 26 at right angles to the shaft 23 and provided with an endless screw 27 meshing with a gear wheel 28 keyed to the shaft 5'. The shaft 23 is coaxial with the shaft 6'. The pinion 24 includes on its surface turned towards the shaft 6', clutch members 29 capable of cooperating with complementary clutch members 30 provided at the facing end of the shaft 6'.

The pinion 24 is provided with a system 31 of movement by centrifugal force of known type, for example of the Watt regulator type, as shown in FIGS. 3 and 4.

This system comprises link rods 31 with weights 32, a ring 33 pivoting on the shaft 6' but blocked in axial translation on the shaft, and a return spring 34.

The motor-reducing gear 22 includes an electric motor with two distinctly different speeds. When the motor rotates at slow speed, the pinion 24 is uncoupled from the shaft 6' (FIG. 4) and is in engagement with the pinion 25.

It is the shaft 5' which is rotated in one direction or the other according to the direction of the current in the electric motor. The endless screw 27 has the purpose, on the one hand, on giving the transmission irreversibility, and on the other hand, of giving the shaft 5' a reduction of the same order as that of the shaft 6'.

When the motor rotates at fast speed, the centrifugal system with weights 32 moves the pinion 24 towards the shaft 6' which is coupled to the shaft 23, although the pinion 25 is no longer in engagement with the pinion 24.

It is the shaft 6' which is then rotated in one direction or the other. As soon as the motor supply is cut off, the pinion 24 resumes its position of FIG. 4.

The two speeds of the motor can be obtained by the placing in circuit of an electrical resistance in the motor circuit, or by diodes, or by any other means.

The control of the motor is mounted, for example, on the dashboard of the vehicle.

Figure 5:
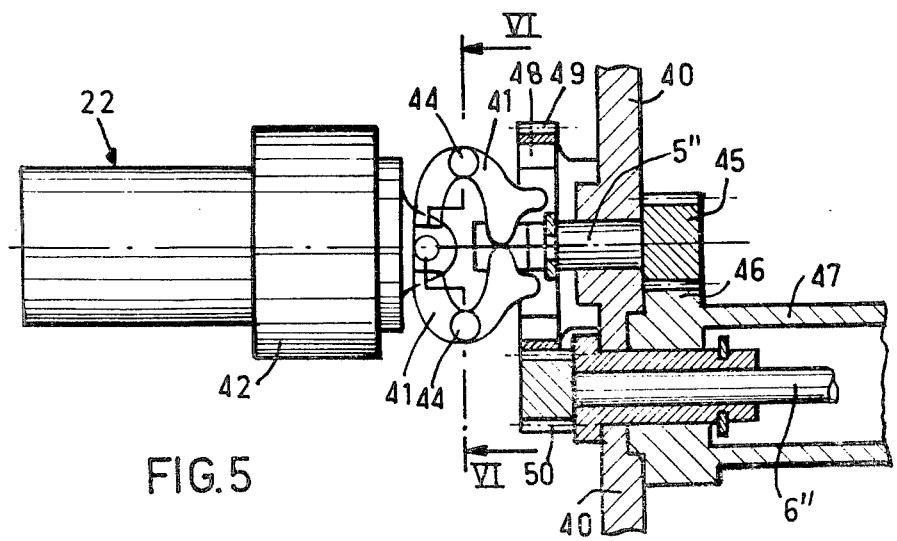
FIG. 5 shows a view in partial section of a third embodiment.

FIGS. 5 and 6 illustrate a modification of the embodiment of FIGS. 3 and 4.

This modification relates to the centrifugal control system for coupling the output shaft of the motor-reducing gear 22 either to the shaft 5" for adjusting the up-down orientation or to the shaft 6" for adjusting the forward-backward orientation.

These two shafts 5" and 6" have practically the same construction and the same arrangement as in the two preceding embodiments. They control the two orientations concerned by similar means shown very partially.

There is shown at 40 in FIG. 5, the lateral wall of the box of the rear view mirror turned towards the vehicle, the motor-reducing gear 22 being, of course, housed inside said box.

The control system by centrifugal force comprises two symmetrical parts 41 in the form of hooks articulated on the end of the output shaft of the reducing gears 42 and playing the role of the weights 32 of FIGS. 3 and 4.

The two hooks 41 are constantly urged back towards one another by two springs 43 fixed at the ends of the balance weights 44 borne by the hooks 41.

In the position of the hooks 41 as shown in FIG. 5, the latter are in engagement with shaft 5" pivoting in the wall 40 and fast to a pinion 45 engaging a corresponding arcuate toothing 46 on a yoke 47 homologous to the yoke 13 of the embodiment of FIGS. 1 and 2.

In the position in which the hooks 41 are most distant from one another, the latter engage with an internally toothed gear wheel 48 coaxial with the shaft 5" and pivoting on the latter.

The gear wheel 48 carries externally a circular toothing 49 in engagement with a pinion 50 fast to the shaft 6".

According as the motor is driven at slow or rapid speed, it is the shaft 5" or the shaft 6", through the toothing 48, which will be rotated.

The active ends of the hooks 41 are obviously shaped similarly so as to ensure the desired engagement with the corresponding members and in both directions or rotation.

It is to be noted that the transmission on the shaft 5" is practically irreversible.

Finally, the invention is obviously not limited to the embodiments illustrated and described above, but covers, on the contrary, any modifications, notably as regards the connection between the two control shafts for the up-down and forward-backward orientations, and the fixed arm at the end of which is mounted the rear view mirror, as well as regards the means for controlling the rotation, from a single drive shaft, either of one, or of the other, of the two above-mentioned control shafts.

We claim:

1. An external rear view mirror having a mirror-box assembly whose orientations are variable from the inside of a vehicle by electrical control in two directions at right angles, forward-backward and up-down, comprising a mirror-box, two parallel drive shafts rotatably mounted within said mirror-box and projecting outwardly therefrom, drive means within said mirror-box operatively connected to said drive shafts to selectively drive said shafts, a fixed arm for mounting said mirror-box to a vehicle, and adjustable means external of said mirror-box pivotally interconnecting said mirror-box and said fixed arm for controlling the orientation of said mirror-box relative to said fixed arm, the outwardly projecting ends of said drive shafts being operatively connected to said adjustable means.

2. A rear view mirror according to claim 1 wherein said adjustable means comprises a pinion on the end of one of said shafts engaging a toothed sector rotatable relative to the mirror-box with respect to an axis coaxial with said second drive shaft, said toothed sector being fixed to a yoke swingable on the end of said arm around a substantially vertical axis, and means operatively connecting said second shaft to said arm, whereby to move said yoke angularly with respect to said arm.

3. A rear view mirror according to claim 1 wherein said drive means comprises two independent motor-reducing gear units each driving one of said drive shafts, said motor-reducing gear units being mounted within said mirror-box.

4. A rear view mirror according to claim 1 wherein said drive means comprises a single motor-reducing gear having two speeds and an output shaft, selective means connecting said output shaft to said two drive shafts, said selective means acting to mechanically link said output shaft with one of said two shafts for one of said two above mentioned speeds and with the other of said shafts for the other speed.

5. A rear view mirror according to claim 4 wherein said selective means comprises a centrifugal force control device including a part fixed in rotation to the output shaft of the motor-reducing gear and provided with articulated members capable, under the effect of centrifugal force, of connection with one or the other of the two drive shafts according to the rotary speed of the output shaft of said motor reducing gear.

6. A rear view mirror according to claim 5 wherein said control device includes a first conical pinion keyed to said output shaft, a second conical pinion connected to the first of said drive shafts, the second drive shaft being mounted coaxially with respect to said first conical pinion, said first conical pinion being movable axially with respect to said output shaft and constituting an element of Watt regulator capable of placing said first conical pinion in engagement either with said second conical pinion or with said second shaft.

7. A rear view mirror according to claim 5 wherein the first said drive shafts is in axial alignment with said output shaft, wherein said second drive shaft is engaged by a crown wheel in coaxial alignment with said output shaft, and wherein said control device includes hooks articulated to said part, said hooks being provided with members adapted to be coupled with either said first drive shaft or with the crown wheel connected to said second drive shaft.

8. A rear view mirror according to claim 6 wherein said second conical pinion is fixed to an intermediate shaft having an endless screw in engagement with a toothed wheel fixed to said first drive shaft.

9. A rear view mirror according to claim 2 wherein said drive means comprises two independent motor-reducing gear units each driving one of said two drive shafts, said two gear units being mounted within said mirror-box.

10. A rear view mirror according to claim 2 wherein said drive means comprises a single motor-reducing gear with two speeds and an output shaft, selective means connecting said output shaft to said two drive shafts, said selective means acting to mechanically link said output shaft with one of said two shafts for one of the two above mentioned speeds and with the other of said shafts for the other speed.

11. A rear view mirror according to claim 2 wherein said fixed arm comprises a second yoke, wherein said second yoke is pivotally connected to said first yoke by a vertically disposed pivot pin, wherein a third yoke is fixed to said second yoke and gripped between said first named yoke and said second yoke, and wherein the means operatively connecting said second shaft to said arm comprises a screw-nut system having a nut threaded on said second shaft and retained by said third yoke.

* * * * *